United States Patent
Rosenboom (10) Patent No.: US 9,497,896 B2
(45) Date of Patent: Nov. 22, 2016

(54) FARM IMPLEMENT WITH STEERING TRACKS

(71) Applicant: Lyn A. Rosenboom, Clifton, IL (US)

(72) Inventor: Lyn A. Rosenboom, Clifton, IL (US)

(*) Notice: Subject to any disclaimer, the term of this patent is extended or adjusted under 35 U.S.C. 154(b) by 0 days.

(21) Appl. No.: 14/748,292

(22) Filed: Jun. 24, 2015

(65) Prior Publication Data

US 2015/0373899 A1 Dec. 31, 2015

Related U.S. Application Data

(60) Provisional application No. 62/017,336, filed on Jun. 26, 2014.

(51) Int. Cl.
| | |
|---|---|
| *B62D 11/00* | (2006.01) |
| *A01B 63/14* | (2006.01) |
| *A01B 69/00* | (2006.01) |
| *A01B 51/04* | (2006.01) |
| *B62D 13/00* | (2006.01) |

(52) U.S. Cl.
CPC ............ *A01B 51/04* (2013.01); *B62D 13/005* (2013.01)

(58) Field of Classification Search
CPC ...... A01B 51/04; A01B 63/14; A01B 69/00; B62D 7/00; B62D 11/00; B62D 11/20
USPC ................... 180/9.38, 9.44, 9.49; 172/423
See application file for complete search history.

(56) References Cited

U.S. PATENT DOCUMENTS

| | | | | | |
|---|---|---|---|---|---|
| 3,533,483 | A | * | 10/1970 | Ballinger | B60K 1/00 180/2.1 |
| 3,900,077 | A | * | 8/1975 | Gee | E02B 17/022 114/313 |
| 4,411,330 | A | * | 10/1983 | Blokland | A61G 5/061 180/198 |
| 5,676,215 | A | * | 10/1997 | Misawa | A61G 5/061 180/9.32 |
| 6,158,536 | A | * | 12/2000 | Misawa | A61G 5/061 180/9.32 |
| 6,691,795 | B2 | * | 2/2004 | L'Abbe | E01H 4/02 172/786 |
| 6,942,226 | B2 | * | 9/2005 | Walkingshaw | A61G 1/0293 280/5.22 |
| 7,380,892 | B2 | * | 6/2008 | Rosenboom | B62D 55/104 180/9.46 |
| 7,726,749 | B2 | * | 6/2010 | Rosenboom | B62D 55/0842 180/9.46 |
| 7,740,084 | B2 | * | 6/2010 | Rosenboom | A01B 51/04 172/292 |
| 8,316,971 | B2 | * | 11/2012 | Couture | B25J 5/005 180/8.7 |
| 8,763,716 | B2 | * | 7/2014 | Rosenboom | A01B 51/04 172/383 |
| 2014/0262563 | A1 | * | 9/2014 | Rosenboom | A01B 51/04 180/9.1 |

* cited by examiner

*Primary Examiner* — Gary Hartmann
(74) *Attorney, Agent, or Firm* — Philip L. Bateman (57) ABSTRACT

A toolbar implement with steering tracks connects to a tractor and a plurality of row units are connected to the toolbar implement. The toolbar implement contains: (a) a main longitudinal frame; (b) a transverse axle assembly; (c) a lift arm assembly pivotably connected to the frame and pivotably connected to the axle assembly for raising or lowering the frame relative to the axle assembly; (d) a control arm pivotably connected to each end of the axle; (e) a track assembly connected to each spindle; and (f) a steering mechanism extending between the control arms.

3 Claims, 7 Drawing Sheets

FIG. 11

FARM IMPLEMENT WITH STEERING TRACKS

CROSS-REFERENCE TO RELATED APPLICATION

This application claims the benefit of U.S. Provisional Application Ser. No. 62/017,336, Jun. 26, 2014.

FIELD OF THE INVENTION

This invention relates to farming. More particularly, this invention relates to toolbar implements.

BACKGROUND OF THE INVENTION

The planting of corn, soybeans, and other crops is typically performed by driving a tractor through the field pulling a toolbar implement. The toolbar implement consists of a frame supported by wheels or tracks and having a transverse bar to which multiple planting units are attached. The planting units are spaced apart along the transverse bar to correspond to the seed rows that will be planted. The term "toolbar" is used interchangeably in the industry to refer to the implement as a whole and to the transverse bar specifically. As used herein, the term "toolbar" refers specifically to the transverse bar to which the planting units are attached and the term "toolbar implement" refers to the implement as a whole.

Toolbar implements commonly contain toolbars having widths of twenty feet (which can accommodate eight planting units spaced thirty inches apart), thirty feet (which can accommodate twelve planting units spaced thirty inches apart), and more. The toolbars are so wide that they commonly are hinged so that the overall width of the implement can be reduced for storage and for travel upon public roads.

Toolbar implements are also used in other farming operations. For example, multi-functional row units are often attached to the toolbar implement to simultaneously till (also known as cultivate or plow), plant, and fertilize in one pass through the field. This method of farming is known as strip tillage, zone tillage, or strip till farming. As used herein, the term "row unit" refers to any type of planter, tiller, multi-functional unit, or the like that is attached to a toolbar implement.

Toolbar implements typically have two positions, a lower working position and an upper storage position. In the working position, the toolbar is in a lower position and the row units are in contact with the ground. In the storage position, the toolbar is in a raised, upper position and the row units are elevated off the ground. The storage position is also used when the toolbar implement is transported.

A typical wheeled toolbar implement contains a main longitudinal frame having a connector at the front and a hitch at the rear. The toolbar is divided into three sections, a hinged left wing, a fixed center, and a hinged right wing. Spaced apart on the center toolbar are two, four, or more wheel assemblies. Each wheel assembly contains a bracket, a motion dampener, a lift arm, and a wheel. Row units are attached to the center toolbar in the spaces between the wheel assemblies.

While wheeled toolbar implements are more common, toolbar implements containing track assemblies are becoming more popular. A track assembly for a toolbar implement is described in Rosenboom, U.S. Pat. No. 7,726,749, Jun. 1, 2010, which is incorporated by reference. Track assemblies make contact with the ground with larger surface areas (footprints) and therefore reduce soil compaction and improve the ability to operate in wet fields. One disadvantage of track assemblies on toolbar implements is that turning is more difficult, both in the field and during transport, because of the larger footprints. Another disadvantage is that many toolbar implements do not keep the lower (ground-contacting) sections of the track perfectly parallel to the ground when on a side incline. Maintaining the track assemblies parallel to the ground at all times is required for optimal stability and traction.

Accordingly, there is a demand for an improved toolbar implement. More particularly, there is a demand for a toolbar implement having tracks that steer and remain parallel to the ground.

SUMMARY OF THE INVENTION

The object of this invention is to provide an improved toolbar implement with tracks that steer and that remain parallel to the ground.

I have invented an improved toolbar implement with steering tracks for connection to a tractor and for connection of a plurality of row units. The toolbar implement comprises: (a) a main longitudinal frame; (b) a transverse axle assembly having two ends; (c) a lift arm assembly pivotably connected to the frame and pivotably connected to the axle assembly for raising or lowering the frame relative to the axle assembly, the pivoting connection of the lift arm assembly to the axle assembly defining a transverse vertical plane; (d) a control arm pivotably connected to each end of the axle, each control arm having a spindle, the pivoting connections of the control arms being in substantially the vertical plane defined by the pivoting connection of the lift arm assembly to the axle assembly; (e) a track assembly connected to each spindle; and (f) a steering mechanism extending between the control arms.

The toolbar implement of this invention has steering tracks that provide many advantages over implements with non-steering tracks. The toolbar implement maintains the track assemblies in the desired parallel orientation to the ground at all times. The toolbar implement also directs the weight of the frame optimally to the track assemblies.

DETAILED DESCRIPTION OF THE INVENTION

This invention is best understood by reference to the drawings. Referring first to FIGS. 1 to 4, a preferred embodiment of the toolbar implement 10 of this invention comprises a main longitudinal frame 20, a transverse axle assembly 30, a lift assembly 40, two control arms 50 at the ends of the axle assembly, two track assemblies 60 mounted onto the control arms, and a steering mechanism 70 to turn the control arms and the track assemblies. The axis of the lift assembly-axle assembly connection is below, and in the same vertical plane as the pivoting connection axes of the control arms. This structure gives the toolbar implement two highly desirable properties. First, it maintains the control arm kingpins perpendicular to the ground which, in turn, maintains the lower portions of the tracks of the track assemblies parallel to the ground at all times for optimal stability and traction on side inclines. Second, it directs the weight of the frame optimally to the track assemblies. The components of the toolbar implement are discussed in more detail below.

Figures 1, 2:
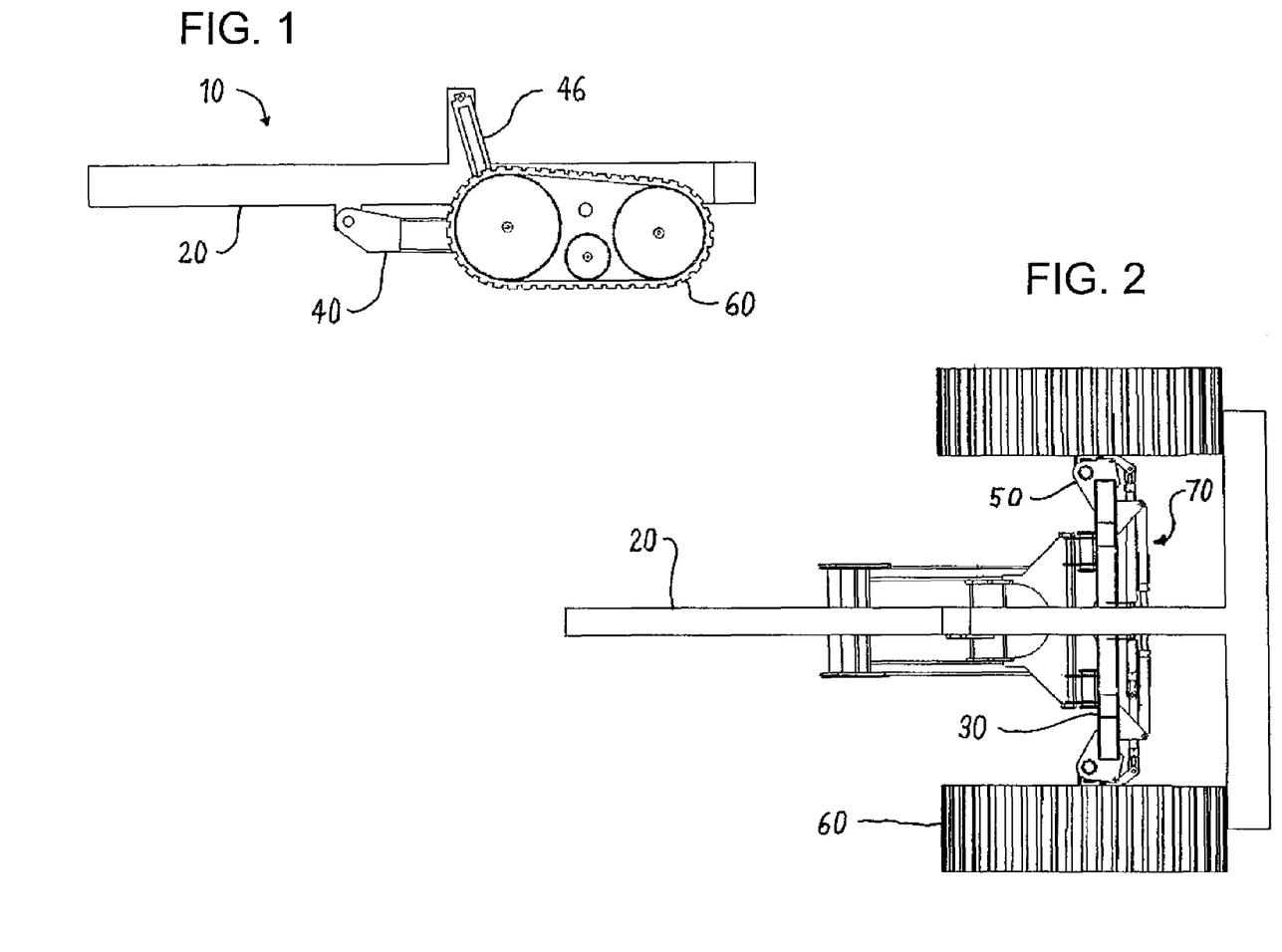
FIG. 1 is a left side elevation view of a preferred embodiment of the implement of this invention in the lower working position.
FIG. 2 is a top view thereof.
Figures 3, 4:
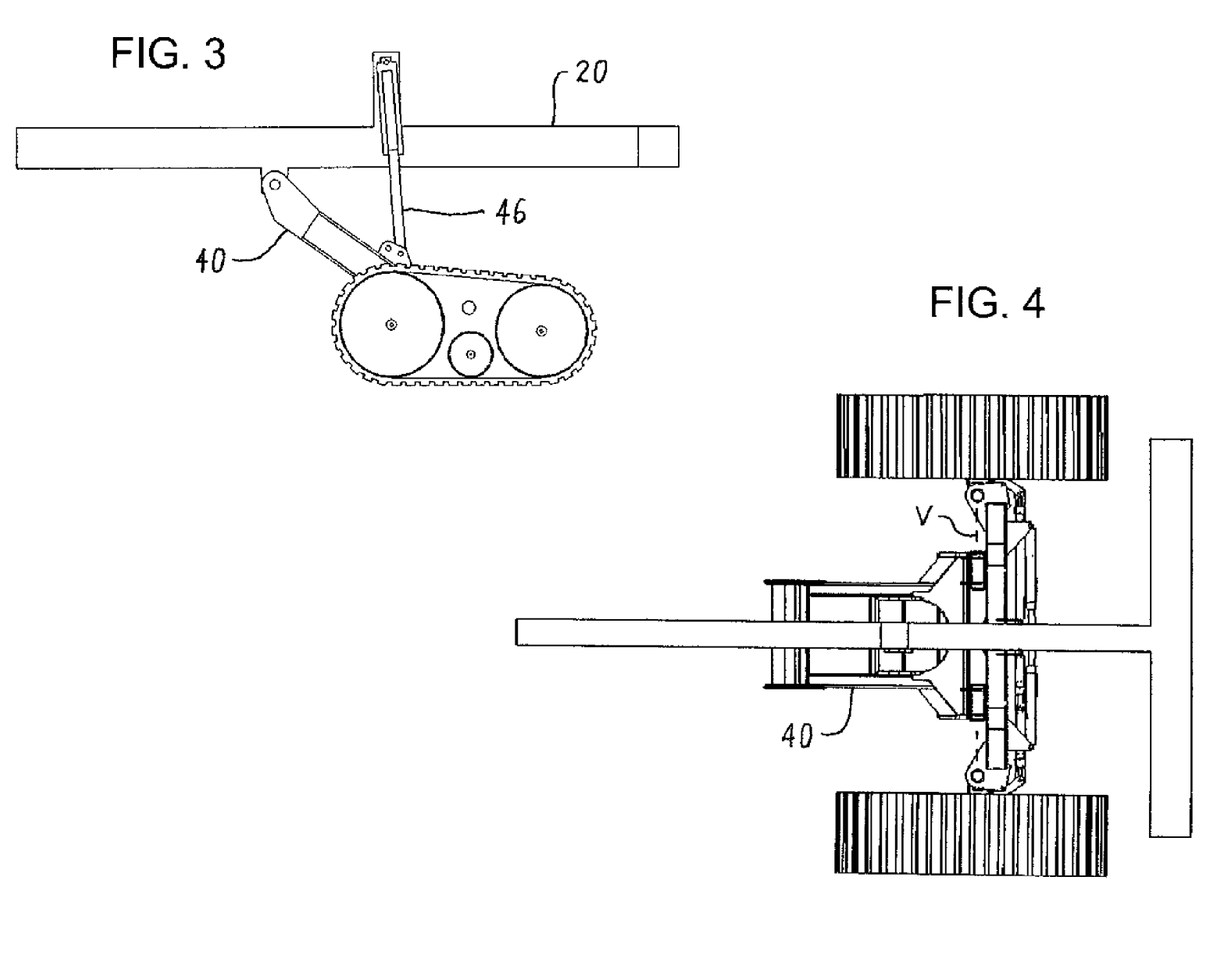
FIG. 3 is a left side elevation view of the implement of this invention in the upper storage position.
FIG. 4 is a top view thereof.
Figure 5:
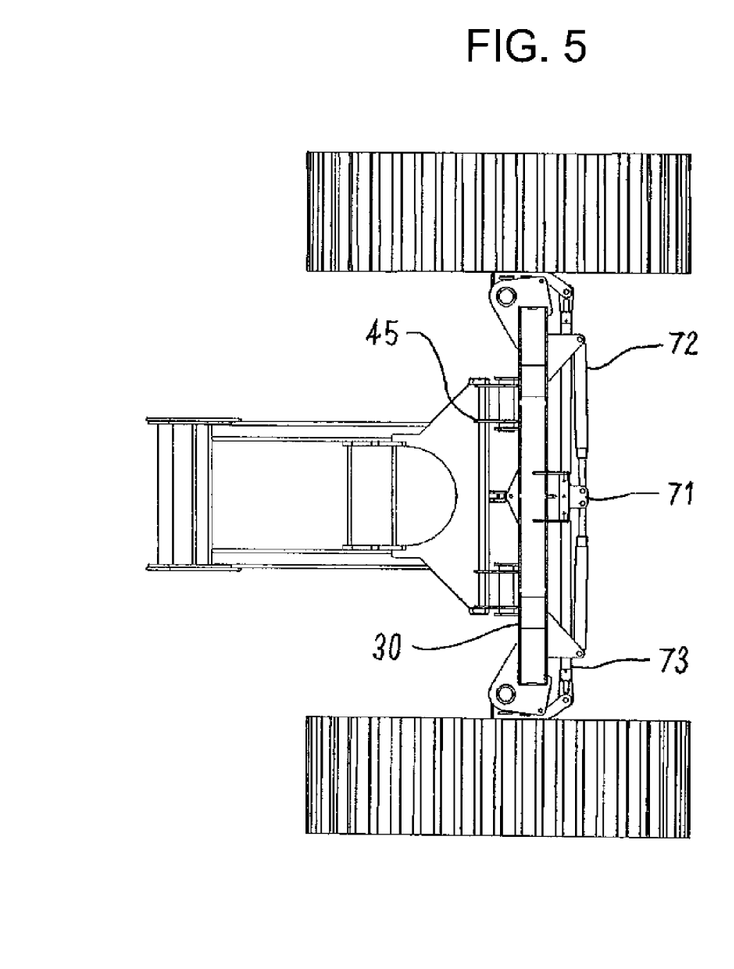
FIG. 5 is a top plan view of the steering mechanism of the implement in the lower working position with the steering tracks aimed straight ahead.
Figure 6:
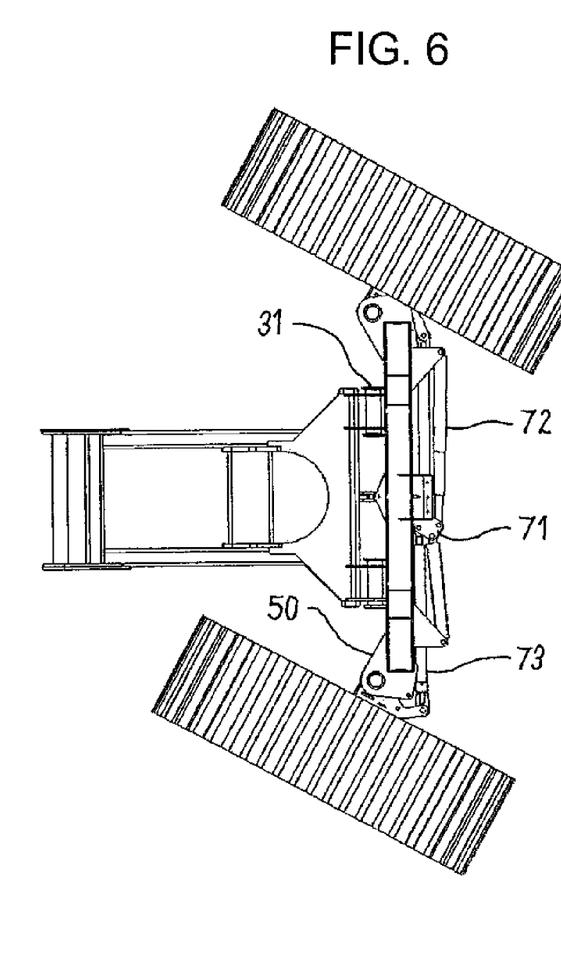
FIG. 6 is a top plan view of the steering mechanism of the implement in the lower working position with the steering tracks aimed to the right.

The main longitudinal frame 20 is conventional and is shown in simplified form for illustration purposes. Accordingly, the transverse toolbars and the front connector are omitted. The frame has two positions relative to the axle assembly and track assemblies: a lower working position as shown in FIGS. 1 and 2, and an upper storage position as shown in FIGS. 3 and 4.

The transverse axle assembly 30 provides the support for the frame. The assembly preferably comprises a steel tube having a square cross-section with multiple brackets attached to it. Lift arm brackets 31 are attached to the front of the axle assembly. The axle assembly has no moving parts. As discussed below, various components of the toolbar implement move relative to the axle assembly.

Figure 7:
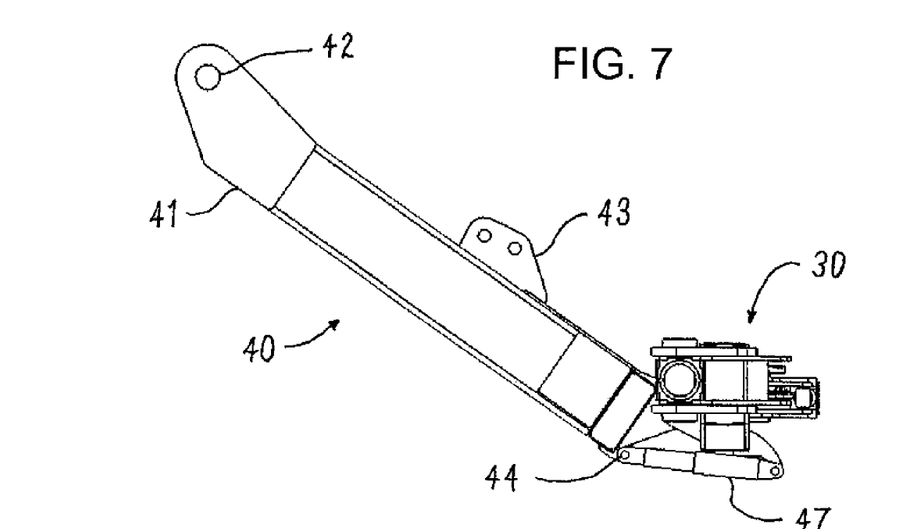
FIG. 7 is a left side elevation view of the lift arm/axle/steering mechanism of the implement in the upper storage position.
Figure 8:
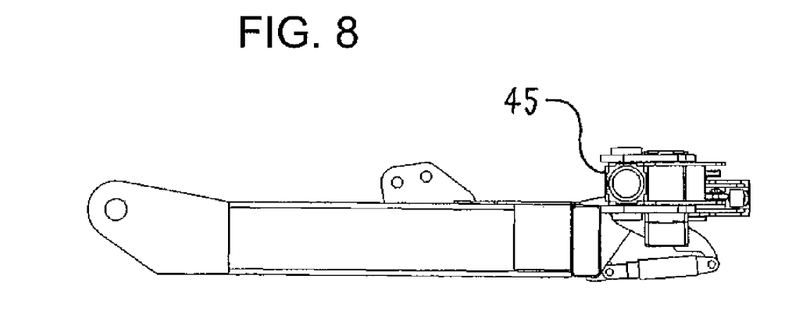
FIG. 8 is a left side elevation view of the lift arm/axle/steering mechanism of the implement in the lower working position.
Figure 9:
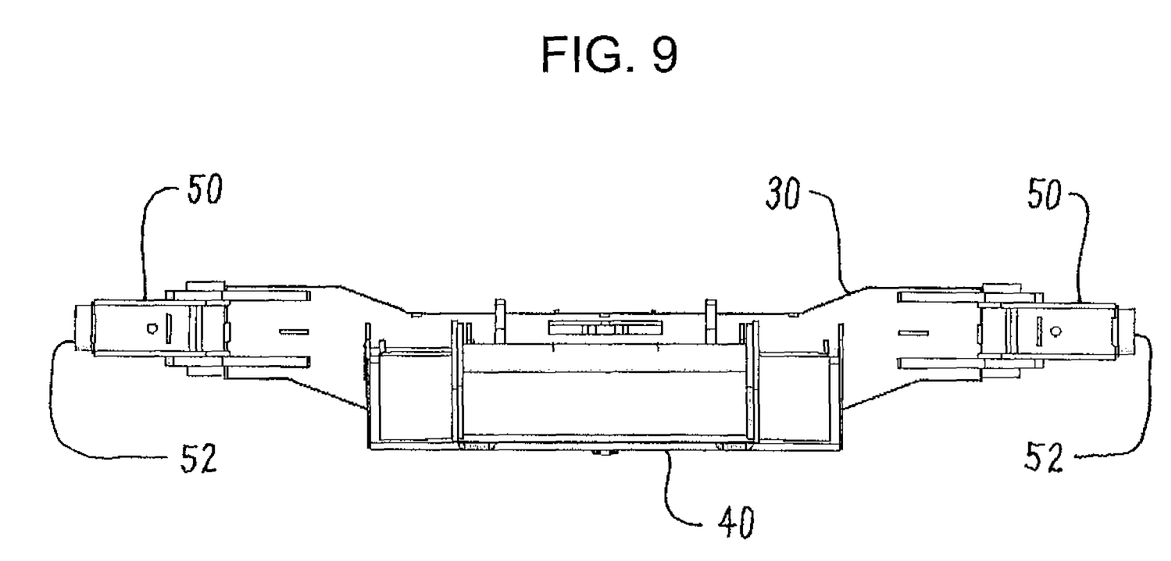
FIG. 9 is a front elevation view of the lift arm and axle of the implement.

The lift assembly 40 moves the frame relative to the axle assembly. Referring now to FIGS. 7 and 8, the main component of the lift assembly is the lift arm 41. The lift arm contains four brackets on each side for pivoting attachments to other components: upper brackets 42, lifting cylinder brackets 43, locking cylinder brackets 44, and lower brackets 45. The lift arm is pivotably connected directly to the frame at the upper brackets and is pivotably connected to lift arm brackets of the axle assembly at the lower brackets. Hydraulic lifting cylinders 46 are pivotably connected between the lifting cylinder brackets of the lift arm and the frame. The hydraulic lines of the lifting cylinders are connected to the hydraulic system of the towing tractor and are controlled by the operator of the tractor. The lifting cylinders provide the force to raise the lift arm (and the frame). Locking arm cylinders 47 are pivotably connected between the locking cylinder brackets and the axle assembly. Although not essential, the locking arm cylinders are preferred because they provide additional stabilization of the lift arm in the upper and lower positions.

Figure 10:
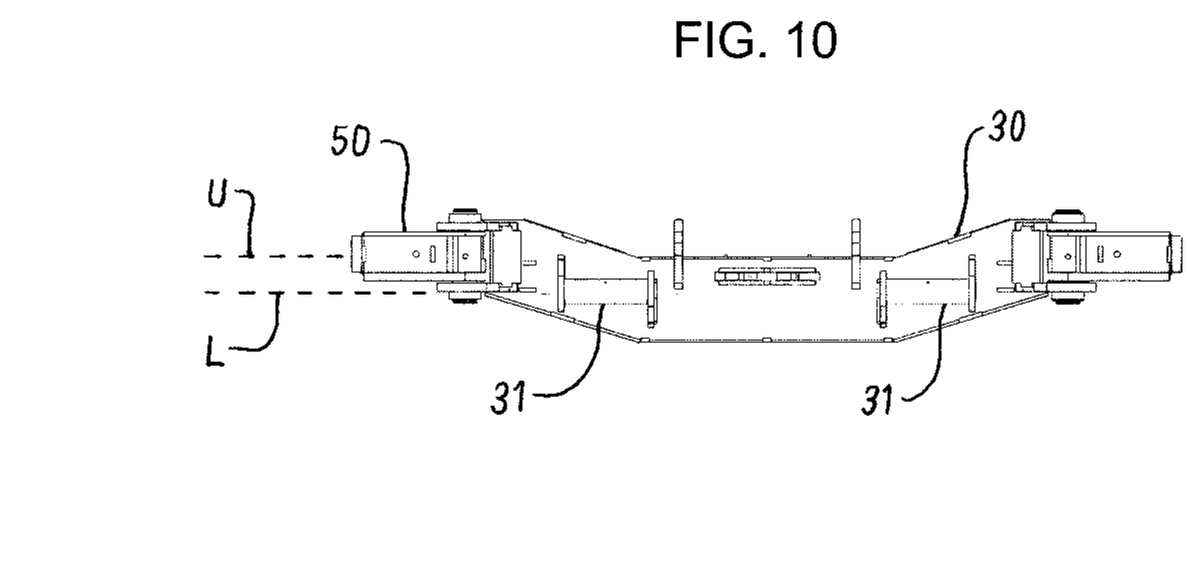
FIG. 10 is a front elevation view of the axle of the implement.

The control arms provide the link between the axle assembly, the track assemblies, and the steering mechanism. Referring now to FIGS. 9 to 13, the control arms 50 are pivotably connected to the ends of the axle assembly. The control arms pivot about vertical axes defined by the kingpins 51. Each control arm has a spindle 52 defining a horizontal axis upon which a track assembly is mounted. The horizontal axis is above the pivoting connection between the lift arm assembly and the axle assembly. This relationship is best seen in FIG. 10 where the upper broken line U represents the horizontal axis of the spindle and the lower broken line L represents the pivoting connection. The lift arm is omitted in FIG. 10 for illustration purposes.

Each control arm also has a bracket 53 to which a component of the steering mechanism is attached. The vertical axes of the kingpins are in about the same vertical plane as the horizontal axis of the pivoting lift assembly. The term "about" is used in this context to mean within a few inches of the precise vertical plane. This relationship is best seen in FIG. 4 where a transverse vertical plane V represented by the broken transverse line passes through both kingpins and also passes through both of the lift arm brackets (which define the horizontal axis of the pivoting lift assembly).

The track assemblies 60 are conventional and are mounted on the control arms. Each track assembly comprises of two or more rollers and a track. The track assemblies roll freely and are not powered.

Figure 11:
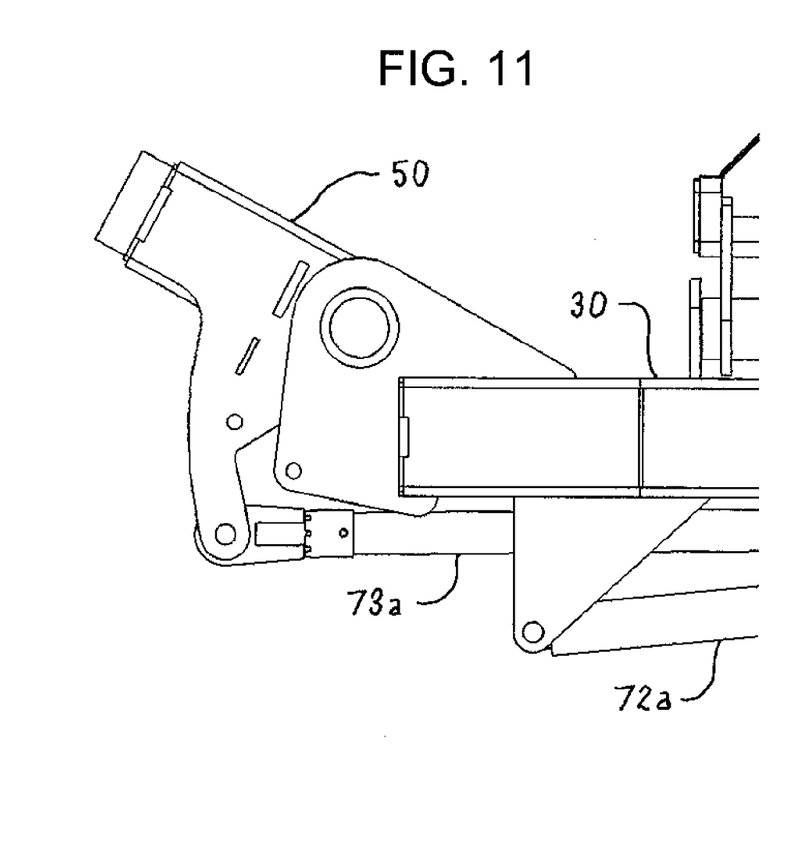
FIG. 11 is a top plan view of the left control arm of the implement aimed to the right.
Figure 12:
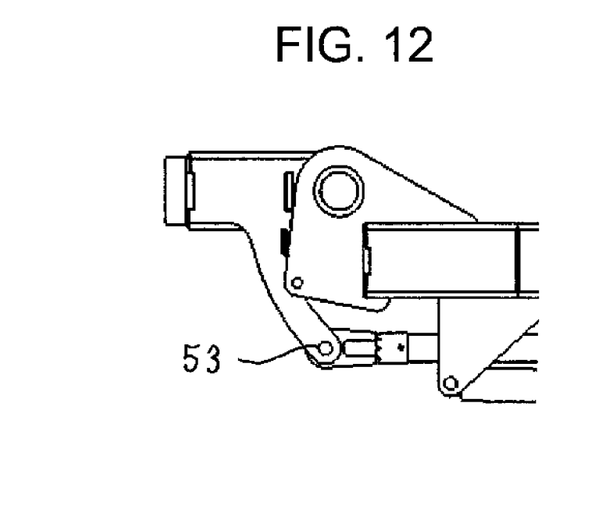
FIG. 12 is a top plan view of the left control arm of the implement aimed straight ahead.
Figure 13:
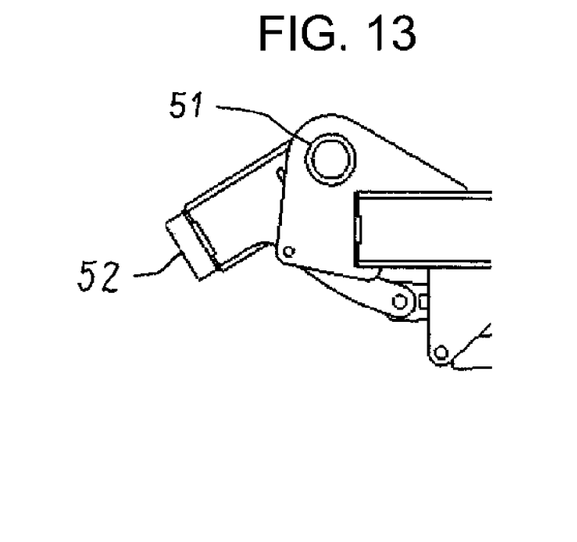
FIG. 13 is a top plan view of the left control arm of the implement aimed to the left.

The steering mechanism 70 moves the control arms that, in turn, move the track assemblies that, in turn, move the implement. The steering mechanism comprises a pivoting connector 71, an upper steering actuator 72, and a lower steering linkage 73. The pivoting connector is pivotably connected to the axle assembly, to the upper steering actuator, and to the lower steering linkage. The upper steering actuator includes left and right hydraulic cylinders that extend between the pivoting connector and brackets mounted to the axle assembly. The lower steering linkage includes left and right arms that extend between the pivoting connector and the control arms. The arms have a constant length. If desired, the steering actuator and the steering linkage are located at the same level instead of one being above the other. The left hydraulic cylinder 72*a* of the upper steering actuator and the left arm 73*a* of the lower steering linkage are seen in FIG. 11.

The hydraulic lines of the left and right hydraulic cylinders are connected to the hydraulic system of the towing tractor and are controlled by the operator of the tractor. The hydraulic lines are plumbed together so the cylinders always operate together. In other words, the left cylinder extends as the right cylinder retracts and vice versa. The movement of the hydraulic cylinders causes the pivoting connector to move from side to side which, in turn, causes the steering arms to move. The movement of the steering arms causes the control arms and track assemblies to move (turn).

The operation of the toolbar implement can now be considered. The implement is attached to the hitch of a tractor using the connector at the front of the frame. The hydraulic lines of the toolbar implement are then attached to the appropriate hydraulic lines of the tractor. After attachment, the operator of the tractor can raise the frame to the storage position, allow the frame to lower to the working position, and can steer (turn) the track assemblies using the hydraulic controls of the tractor.

The placement of the lift arm lower brackets below the control arm spindles and in substantially the same vertical plane as the control arm kingpins ensures that the downward forces exerted by the frame, toolbars, and row units are directed where the track assemblies are best able to accommodate them for maximum durability. This placement also maintains the kingpins perpendicular to the ground which, in turn, maintains the lower portions of the tracks of the track assemblies parallel to the ground at all times for optimal stability and fraction on side inclines.

I claim:

1. A toolbar implement with steering tracks for connection to a tractor and for connection of a plurality of row units, the toolbar implement comprising:
   (a) a main longitudinal frame;
   (b) a transverse axle assembly having two ends;
   (c) a lift arm assembly pivotably connected to the frame and pivotably connected to the axle assembly for raising or lowering the frame relative to the axle assembly, the pivoting connection of the lift arm assembly to the axle assembly defining a transverse vertical plane;
   (d) a control arm pivotably connected to each end of the axle, each control arm having a spindle, the pivoting connections of the control arms defining vertical axes, both vertical axes being in about the vertical plane defined by the pivoting connection of the lift arm assembly to the axle assembly;
   (e) a track assembly connected to each spindle; and
   (f) a steering mechanism extending between the control arms.

2. The toolbar implement of claim 1 wherein the pivoting connection of the lift arm assembly to the axle assembly is below the spindles of the control arms.

3. The toolbar implement of claim 2 wherein the steering mechanism comprises a pivoting connector, a steering actuator comprising left and right hydraulic cylinders extending between the pivoting connector and brackets at the ends of the axle assembly, and a steering linkage comprising left and right arms extending between the pivoting connector and the control arms.

* * * * *